(12) United States Patent
Seung et al.

(10) Patent No.: US 11,130,366 B2
(45) Date of Patent: Sep. 28, 2021

(54) RESONATOR WHEEL

(71) Applicant: HANDS CORPORATION LTD., Incheon (KR)

(72) Inventors: Hyeon Chang Seung, Seoul (KR); Suk Choo Rhee, Incheon (KR); Young Sik Kim, Incheon (KR); Kyoung Duck Shin, Gimpo-si (KR); Keon Ki Han, Incheon (KR); In Bum Hwang, Incheon (KR)

(73) Assignee: HANDS CORPORATION LTD.

( * ) Notice: Subject to any disclaimer, the term of this patent is extended or adjusted under 35 U.S.C. 154(b) by 307 days.

(21) Appl. No.: 16/464,749

(22) PCT Filed: Nov. 13, 2018

(86) PCT No.: PCT/KR2018/013759
§ 371 (c)(1),
(2) Date: May 29, 2019

(87) PCT Pub. No.: WO2019/151622
PCT Pub. Date: Aug. 8, 2019

(65) Prior Publication Data
US 2020/0316988 A1  Oct. 8, 2020

(30) Foreign Application Priority Data
Feb. 1, 2018 (KR) .................. 10-2018-0012846

(51) Int. Cl.
*B60B 21/12* (2006.01)
*B60C 19/00* (2006.01)
(Continued)

(52) U.S. Cl.
CPC ............ *B60B 21/12* (2013.01); *B60C 19/002* (2013.01); *B60B 21/026* (2013.01); *B60B 25/22* (2013.01);
(Continued)

(58) Field of Classification Search
CPC ...... B60B 21/12; B60B 21/026; B60C 19/002
See application file for complete search history.

(56) References Cited

U.S. PATENT DOCUMENTS 9,604,583 B2    3/2017  Seo
2016/0288738 A1  10/2016  Seo
(Continued)

FOREIGN PATENT DOCUMENTS

EP    2962866 A1    1/2016
GB    2536034 A     9/2016
(Continued)

OTHER PUBLICATIONS

International Search Report (in Korean) issued in PCT/KR2018/013759, dated Mar. 5, 2019; ISA/KR.
(Continued)

*Primary Examiner* — Scott A Browne
(74) *Attorney, Agent, or Firm* — Harness, Dickey & Pierce, P.L.C.

(57) ABSTRACT

A resonator wheel is disclosed. In accordance with one aspect of the present invention, the resonator wheel includes a wheel rim; a first annular wall protruding from an outer circumferential surface of the wheel rim along a circumference of the wheel rim, the first annular wall including a tube mounting groove formed on one side surface of the first annular wall; a second annular wall protruding from the outer circumferential surface of the wheel rim along the circumference of the wheel rim and spaced apart from the first annular wall; a plurality of resonance tubes disposed on the outer circumferential surface of the wheel rim between the first annular wall and the second annular wall, each of the resonance tubes including: a tube body including a resonance chamber and a communication hole extending from the resonance chamber; a first flange protruding from one side of the tube body and having one end inserted into the
(Continued)

tube mounting groove; and a second flange protruding from a an opposite side of the tube body and having one end disposed adjacent to the second annular wall; and a fastening member surrounding one radially outer surface of the second flange between the tube body and the second annular wall along the circumference of the wheel rim, the fastening member pressing the second flange in a radially inward direction of the wheel rim.

5 Claims, 5 Drawing Sheets

(51) Int. Cl.
*B60B 21/02* (2006.01)
*B60B 25/22* (2006.01)

(52) U.S. Cl.
CPC ... *B60B 2900/131* (2013.01); *B60B 2900/133* (2013.01)

(56) References Cited

U.S. PATENT DOCUMENTS

| | | |
|---|---|---|
| 2018/0229546 A1 | 8/2018 | Seung |
| 2018/0319208 A1 | 11/2018 | Seung |
| 2020/0023684 A1* | 1/2020 | Osawa ................ B60C 23/0498 |
| 2020/0164683 A1* | 5/2020 | Saito .................... G10K 11/172 |

FOREIGN PATENT DOCUMENTS

| | | |
|---|---|---|
| JP | 2012040968 A | 3/2012 |
| JP | 5091749 B2 | 12/2012 |
| JP | 2015174506 A | 10/2015 |
| KR | 1020160116741 A | 10/2016 |
| KR | 20170116321 A | 10/2017 |
| KR | 1020170116321 A | 10/2017 |

OTHER PUBLICATIONS

Extended European Search Report for Application No. 18877311.3 dated Apr. 22, 2020 (6 pages).

* cited by examiner (a)

(b)

(c)

RESONATOR WHEEL

CROSS-REFERENCE TO RELATED APPLICATIONS

This application is a U.S. National Phase Application under 35 U.S.C. 371 of International Application No. PCT/KR2018/013759, filed on Nov. 13, 2018, which claims the benefit of Korean Patent Application No. 10-2018-0012846, filed on Feb. 1, 2018. The entire disclosures of the above applications are incorporated herein by reference.

TECHNICAL FIELD

The present disclosure relates to a resonator wheel.

BACKGROUND ART

The statements in this section merely provide background information related to the present disclosure and may not constitute prior art.

Generally, an automobile tire is filled with air while being coupled to a wheel rim, and serves to elastically support a vehicle body through shock absorbing action of air inside the tire.

During travel of the vehicle, friction continuously occurs between the tire and the road surface. Then, the side wall of the tire vibrates due to the vibration action of the tire on the road surface, and resonance occurs in the internal space of the tire due to vibration of the side wall.

Resonance in the internal space of the tire generates resonance sound having a sharp peak in a frequency band of 200 Hz to 300 Hz. The resonance sound is transmitted to the interior of the vehicle, causing noise that causes driver discomfort. Further, continuous noise deteriorates ride comfort.

Conventionally, in order to address the above-mentioned issue, a resonance tube based on a Helmholtz resonator principle is mounted on a wheel rim to attenuate resonance sound generated in the internal space of the tire. Specifically, the conventional resonance tube is mounted on the wheel rim by inserting the flanges of the resonance tube into insertion grooves formed at both axial ends of the wheel rim.

The conventional resonance tube is mounted on the wheel rim by sequentially inserting a flange formed on one side of the resonance tube into an insertion groove formed on one side of the wheel rim and then inserting a flange formed on the other side of the resonance tube into an insertion groove formed on the other side of the wheel rim. Accordingly, the conventional resonance tube is generally made of a plastic material capable of elastic deformation.

However, in the case of such conventional sequential mounting method of the resonance tube, at least one of the flanges of the resonance tube inserted into the two insertion grooves is insufficiently inserted. Accordingly, the conventional resonance tube is often detached from the wheel rim.

In the conventional sequential mounting method of the resonance tube, when plural resonance tubes are to be mounted on the wheel rim, the resonance tubes should be mounted one by one by inserting the flanges of each of the resonance tubes into both insertion grooves, which is cumbersome.

DISCLOSURE

Technical Problem

Accordingly, it is one object of the present invention to provide a resonance tube mounting method capable of preventing a resonance tube from being separated from a wheel rim such that the resonance tube is more securely mounted on the wheel rim.

It is another object of the present invention to provide a resonance tube mounting method that may facilitate mounting of a plurality of resonance tubes on the wheel rim.

Technical Solution

In accordance with one aspect of the present invention, provided is a resonator wheel including a wheel rim; a first annular wall protruding from an outer circumferential surface of the wheel rim along a circumference of the wheel rim, the first annular wall including a tube mounting groove formed on one side surface of the first annular wall; a second annular wall protruding from the outer circumferential surface of the wheel rim along the circumference of the wheel rim and spaced apart from the first annular wall; a plurality of resonance tubes disposed on the outer circumferential surface of the wheel rim between the first annular wall and the second annular wall, each of the resonance tubes including: a tube body including a resonance chamber and a communication hole extending from the resonance chamber; a first flange protruding from one side of the tube body and having one end inserted into the tube mounting groove; and a second flange protruding from an opposite side of the tube body and having one end disposed adjacent to the second annular wall; and a fastening member surrounding one radially outer surface of the second flange between the tube body and the second annular wall along the circumference of the wheel rim, the fastening member pressing the second flange in a radially inward direction of the wheel rim.

Advantageous Effects

As described above, according to the present disclosure, a resonance tube may be pressed radially inward on a wheel rim using a fastening member. Thereby, the resonance tube may be prevented from being separated from the wheel rim. As a result, the resonance tube may be more securely mounted on the wheel rim.

In addition, mounting a plurality of resonance tubes on the wheel rim may be completed at one time using a fastening member after the resonance tubes are provisionally mounted. Accordingly, the plurality of resonance tubes may be easily mounted.

BEST MODE

Figure 1:
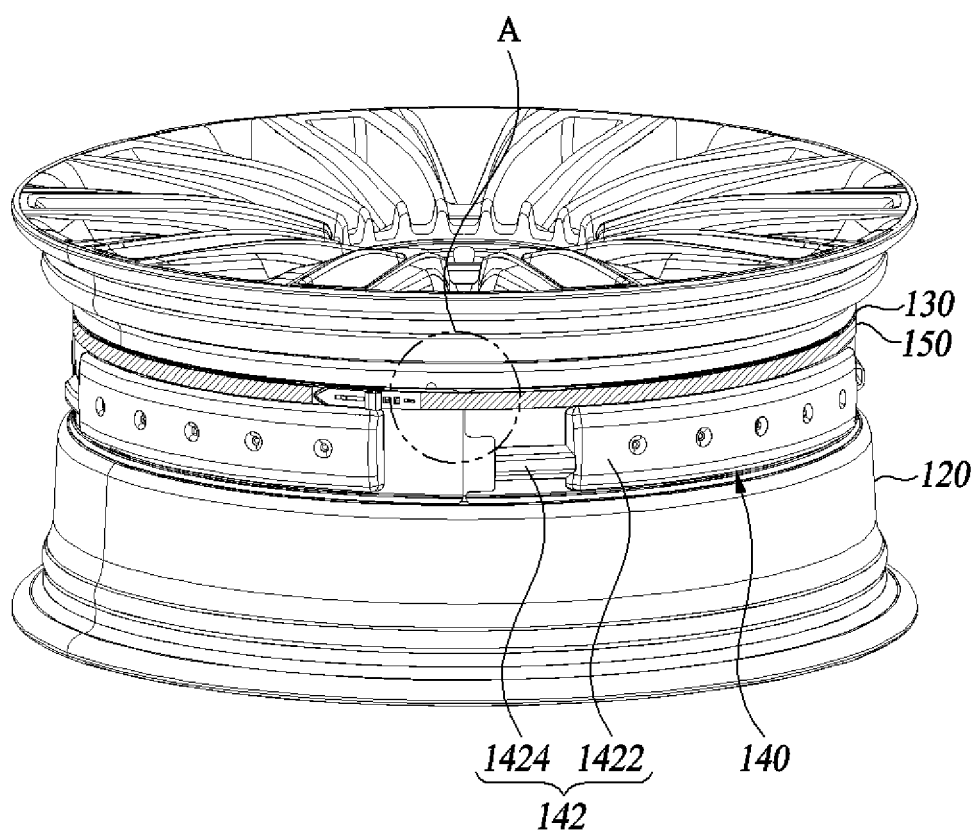
FIG. 1 is a perspective view of a resonator wheel according to one embodiment of the present disclosure.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

In describing the components of the embodiment according to the present invention, various terms such as first, second, i), ii), a), b) and the like may be used. These terms are used solely for the purpose of distinguishing one component from another, but neither implies nor suggests the substances, the order or sequence of the components. Throughout this specification, when a part "includes" or "comprises" a component, the part may further include other components, and such other components are not excluded unless there is a particular description contrary thereto.

FIG. 1 is a perspective view of a resonator wheel 10 according to one embodiment of the present disclosure.

Figure 2:
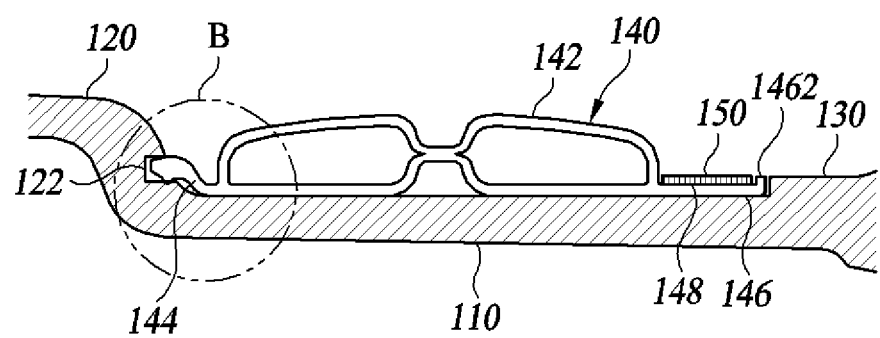
FIG. 2 is a cross-sectional view of the resonator wheel according to one embodiment of the present disclosure.

FIG. 2 is a cross-sectional view of the resonator wheel 10 according to one embodiment of the present disclosure.

Referring to FIGS. 1 and 2, the resonator wheel includes a wheel rim 110, a first annular wall 120, a second annular wall 130, a resonance tube 140, and a fastening member 150.

The wheel rim 110 refers to an annular portion formed on the radially outer side of a vehicle wheel. A vehicle tire, the resonance tube 140, and the like may be mounted on the wheel rim 110.

In the description of the resonator wheel 10 according to the present disclosure, which will be described below, the terms "radial," "circumferential," and "axial" directions refer to the radial direction of the wheel rim 110, the circumferential direction of the wheel rim 110 and the axial direction of the wheel rim 110, respectively.

The first annular wall 120 protrudes from the outer circumferential surface of the wheel rim 110 along the circumference of the wheel rim 110. In addition, the first annular wall 120 includes a tube mounting groove 122 formed on one side surface of the first annular wall 120.

The second annular wall 130 protrudes from the outer circumferential surface of the wheel rim 110 along the circumference of the wheel rim 110 and is disposed spaced apart from the first annular wall 120.

A plurality of resonance tubes 140 is disposed on the outer circumferential surface of the wheel rim 110 between the first annular wall 120 and the second annular wall 130.

Each resonance tube 140 includes a tube body 142, a first flange 144, and a second flange 146.

The tube body 142 includes a resonance chamber 1422 and a communication hole 1424 extending from the resonance chamber 1422. The communication hole 1424 may be a hole through which the resonance chamber 1422 communicates with the space outside the resonance chamber 1422.

The resonance tube 140 according to the present disclosure employs the principle of Helmholtz resonance to attenuate noise generated in the wheel.

A Helmholtz resonator consists of an internal space and a neck portion through which the internal space communicates with a region outside the internal space. The Helmholtz resonator forms a vibration system as the air in the neck portion acts as a mass and the air in the internal space acts as a spring.

In such a vibration system, resonance occurs at a specific frequency, a so-called resonance frequency. When resonance occurs in the Helmholtz resonator, the air around the neck portion repeatedly vigorously exits and enters the neck portion, causing continuous friction between the tube wall of the neck portion and the air in the neck portion. As a result, the vibration energy is converted into thermal energy by friction, and thus sound absorption is carried out.

In the resonance tube 140 according to the present disclosure, the resonance chamber 1422 and the communication hole 1424 of the tube body 142 are components corresponding to the internal space and the neck portion of the Helmholtz resonator described above, respectively. Accordingly, the resonance tube 140 attenuates noise generated in the wheel based on the Helmholtz resonator principle described above.

The plurality of resonance tubes 140 may have different resonance frequencies. The resonant frequency of the Helmholtz resonator is determined by factors such as the effective diameter of the neck portion, the length of the neck portion, the cross-sectional area of the neck portion, and the volume of the internal space.

That is, the resonance tubes 140 may be designed to have a specific resonance frequency that may attenuate noise generated in the wheel, by adjusting the values of the above-described factors. However, each resonance tube 140 has only one resonance frequency. Accordingly, when a plurality of resonance tubes 140 has the same resonance frequency, the frequency range in which sound absorption occurs may be limited to a narrow range around the resonance frequency.

Accordingly, the resonator wheel 10 according to one embodiment of the present disclosure intentionally allows the plurality of resonance tubes 140 to have different resonance frequencies, thereby achieving noise attenuation in a wider frequency range.

The first flange 144 protrudes from one side of the tube body 142 and thus one end of the first flange 144 is inserted into the tube mounting groove 122.

For the resonator wheel 10 according to the present disclosure, as one end of the first flange 144 is inserted into the tube mounting groove 122, the resonance tube 140 can be provisionally mounted on the outer circumferential surface of the wheel rim 110 before the resonance tube 140 is fastened by the fastening member 150. Details regarding the provisional mounting of the resonance tube 140 will be described with reference to FIG. 3.

The first flange 144 may include an elastic region 1442 and an insertion region 1444. The insertion region 1444 may include a downward slope and an elastic fitting projection 510. The elastic region 1442 and the insertion region 1444 will be described in detail with reference to FIG. 5.

Referring again to FIGS. 1 and 2, the second flange 146 protrudes from the other side of the tube body 142 such that one end of the second flange 146 is disposed adjacent to the second annular wall 130.

In order to prevent the axial movement of the resonance tube 140, one end of the second flange 146 may be in contact with the second annular wall 130 with the resonance tube 140 mounted on the outer circumferential surface of the wheel rim 110.

In addition, a rotation preventing projection 1464 may be formed at one end of the second flange 146 to prevent circumferential rotation of the resonance tube 140 on the outer circumferential surface of the wheel rim 110. A detailed description of the rotation preventing projection 1464 will be given with reference to FIG. 4.

Referring again to FIGS. 1 and 2, the fastening member 150 is disposed between the tube body 142 and the second annular wall 130 to surround one radially outer surface of the second flange 146 along the circumference of the wheel rim 110.

As the fastening member 150 surrounds one surface of the second flange 146, the fastening member presses the second flange 146 in the radially inward direction of the wheel rim 110. Thus, the resonance tube 140 may be prevented from being separated from the outer circumferential surface of the wheel rim 110.

In addition, since the resonance tube 140 is pressed by the fastening member 150 in the radially inward direction, normal force applied to the resonance tube 140 by the outer circumferential surface of the wheel rim 110 also becomes strong. As a result, stronger frictional force may be generated between the resonance tube 140 and the wheel rim 110, thereby preventing the circumferential or axial movement of the resonance tube 140 on the outer circumferential surface of the wheel rim 110.

Referring to FIG. 2, the second flange 146 may include a fastening member seating step 1462 protruding from one surface of the second flange 146. The fastening member seating step 1462 may define a fastening groove 148 between the tube body 142 and the fastening member seating step 1462, and the fastening member 150 may be mounted in the fastening groove 148.

The resonator wheel 10 according to one embodiment of the present disclosure may prevent the axial movement of the fastening member 150 on one surface of the second flange 146 by mounting the fastening member 150 in the fastening groove 148. Further, the mounting position of the fastening member 150 may be marked such that the fastening member 150 can be conveniently mounted on one surface of the second flange 146.

Further, when the fastening member seating step 1462 protrudes from one end of the second flange 146, the fastening groove 148 may have a greater axial width, thereby allowing the fastening member 150 having a greater axial width to be mounted in the fastening groove 148. Since the fastening member 150 having a greater axial width has higher durability and rigidity, it may press the resonance member 140 more strongly.

In addition, since the fastening groove 148 is formed by utilizing one side surface of the tube body 142 facing the second annular wall 130, the fastening groove 148 may be formed by one fastening member seating step 1462 alone, and thus the axial width of the fastening groove 148 may be increased compared to a case where two seating steps are utilized.

The fastening member seating step 1462 may protrude from one end of the second flange 146. Thus, the fastening member seating step 1462 may adjoin or contact the second annular wall 130 with the resonance tube 140 mounted on the outer circumferential surface of the wheel rim 110.

Thus, the second flange 146 and the second annular wall 130 face each other over a wider area. Accordingly, when the second flange 146 presses the second annular wall 130, the reaction force of the second annular wall 130 is applied to the first annular wall 146 over a wider area. In this case, the axial movement of the resonance tube 140 may be more securely prevented.

When the fastening member 150 presses the second flange 146 in the radially inward direction, tensile stress is generated in the fastening member 150. To apply more force in the radially inward direction, the fastening member 150 may be more strongly tightened. Then, larger tensile stress is generated in the fastening member 150.

That is, in order to strongly tighten the resonance tube 140 with the fastening member 150, the fastening member 150 is required to withstand high tensile stress. Accordingly, the fastening member 150 may be formed of a metal material having sufficient stiffness, such as stainless steel.

Figure 3:
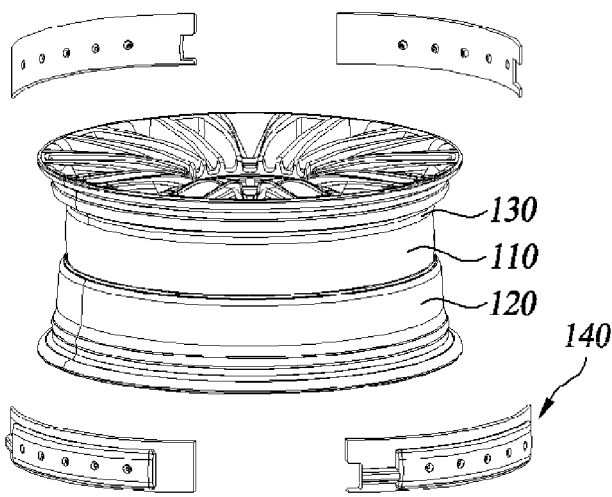
FIG. 3 illustrates a process of mounting the resonance tube on a wheel rim according to one embodiment of the present disclosure.
Figure 3:
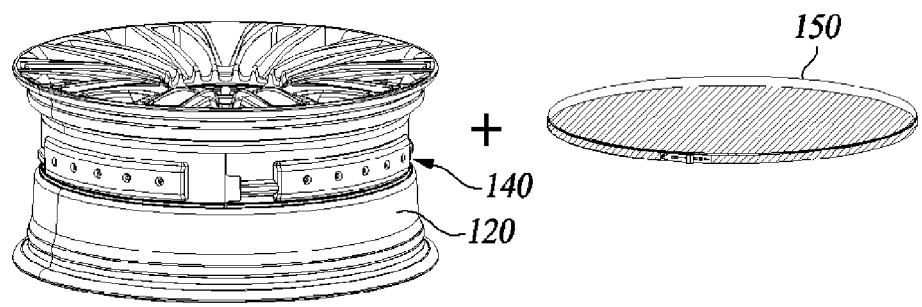
Figure 3:
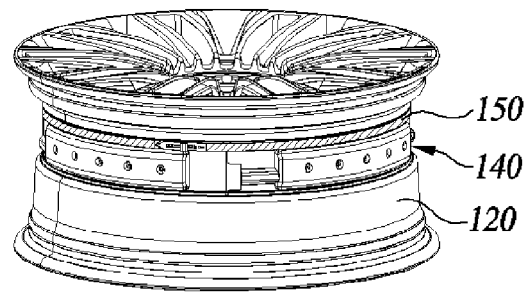

FIG. 3 illustrates a process of mounting the resonance tube 140 on a wheel rim 110 according to one embodiment of the present disclosure.

Referring to FIG. 3, a plurality of resonance tubes 140 may be mounted on the outer circumferential surface of the wheel rim 110, following sequential operations shown in FIGS. 3(a), 3(b) and 3(c).

Referring to FIGS. 3(a) and 3(b), the resonance tubes 140 of the plurality of resonance tubes 140 may be spaced apart from each other. In addition, by inserting the first flange 144 of each resonance tube 140 into the tube mounting groove 122 of the first annular wall 120, the plurality of resonance tubes 140 may be provisionally mounted on the wheel rim 110.

For the resonator wheel 10 according to the present disclosure, the resonance tubes 140 are pressed in the radially inward direction using the fastening member 150 to mount the resonance tubes 140 on the outer circumferential surface of the wheel rim 110. Because of this mounting method of the resonance tubes 140, the resonator wheel 10 according to the present disclosure requires a provisional mounting process of temporarily mounting the resonance tubes 140 on the outer circumferential surface of the wheel rim 110 before the resonance tubes 140 are mounted by arranging the fastening member 150.

Here, the most commonly conceivable method for provisional mounting is to annularly arrange a plurality of resonance tubes connected to each other on the outer circumferential surface of the wheel rim. However, this provisional mounting method is disadvantageous in that an additional process of connecting the plurality of resonance tubes is required. In addition, this mounting method is disadvantageous in that the resonance tubes are vulnerable to axial movement even after the fastening member is mounted.

Referring again to FIGS. 3(a) and 3(b), as the resonator wheel 10 according to the present disclosure adopts the provisional mounting method of inserting the first flange 144 of the resonance tube 140 into the tube mounting groove 122 of the first annular wall 120, the plurality of resonance tubes 140 may be provisionally mounted on the wheel rim 110 while being spaced apart from each other. In addition, as the first flange 144 is inserted into the tube mounting groove 122, axial movement of the resonance tubes 140 may be prevented.

Referring to FIG. 3(c), the fastening member 150 is mounted so as to surround one surface of the second flange 146 with the plurality of resonance tubes 140 provisionally mounted on the wheel rim 110. Then, the fastening member 150 may press the resonance tubes 140 radially inward.

Thereby, the resonator wheel 10 according to the present disclosure may complete the mounting of the resonance tubes 140 on the wheel rim 110.

Figure 4:
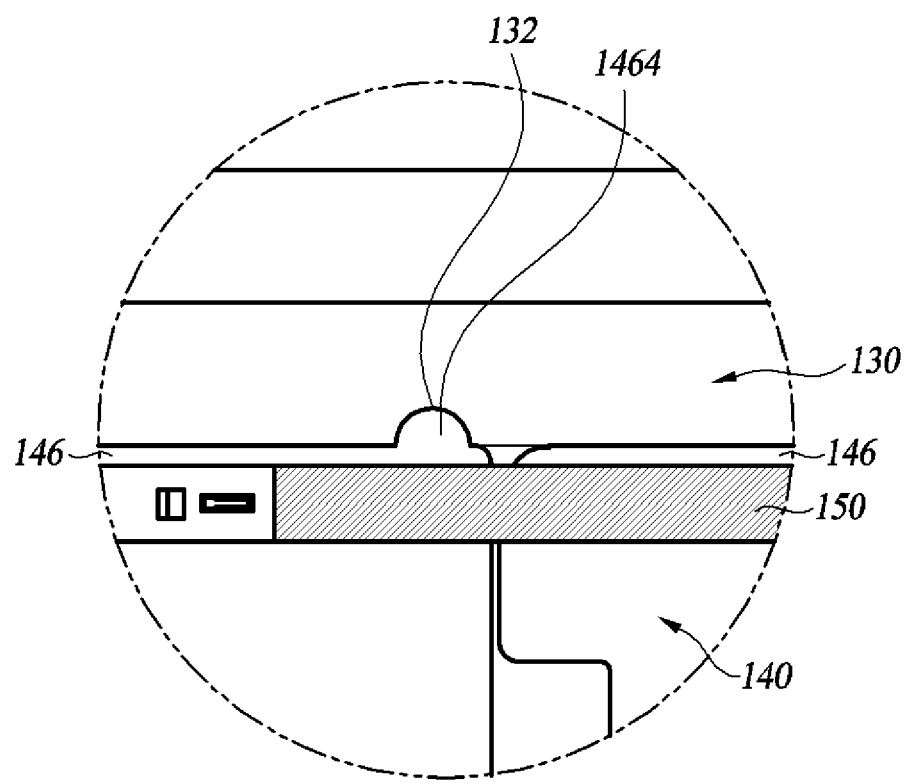
FIG. 4 is an enlarged perspective view of area A of FIG. 1 in the resonator wheel according to one embodiment of the present disclosure.

FIG. 4 is an enlarged perspective view of area A of FIG. 1 in the resonator wheel 10 according to one embodiment of the present disclosure.

Referring to FIG. 4, the second flange 146 may include a rotation preventing projection 1464 protruding from one end of the second flange 146, and the second annular wall 130 may include a projection mounting groove 132 formed on one side surface of the second annular wall 130.

The rotation preventing projection 1464 may be inserted into the projection mounting groove 132. Thereby, the resonance tube 140 may be prevented from moving in the circumferential direction on the outer circumferential surface of the wheel rim 110.

The projection mounting groove 132 according to the embodiment of the present disclosure indicates positions where the plurality of resonance tubes 140 is to be disposed on the outer circumferential surface of the wheel rim 110, thereby guiding the plurality of resonance tubes 140 so as to be aligned on the outer circumferential surface of the wheel rim 110.

To more effectively prevent circumferential rotation of the resonance tube 140, a plurality of rotation preventing projections 1464 may be formed at one end of the second flange 146. Specifically, a pair of rotation preventing projections 1464 may be formed at both circumferential ends of the second flange 146, respectively.

The rotation preventing projection 1464 may be shaped such that the circumferential width of the rotation preventing projection 1464 decreases as the rotation preventing projection 1464 extends from the second flange 146. In accordance with the shape of the rotation preventing projection 1464, the projection mounting groove 132 may be shaped such that the circumferential width of the second annular wall 130 decreases as it extends axially inward.

The resonance tube 140 according to the present disclosure is mounted on the outer circumferential surface of the wheel rim 110 with one end of the first flange 144 inserted into the tube mounting groove 122. Once mounted, the resonance tube 140 cannot be separated radially outwardly. In order to separate the resonance tube 140, the resonance tube 140 needs to be pushed toward the second annular wall 130 to separate the first flange 144 from the tube mounting groove 122.

At this time, in order to separate the resonance tube 140 including the rotation preventing projection 1464, the rotation preventing projection 1464 needs to be separated from the projection mounting groove 132 by pushing the resonance tube 140 toward the first annular wall 120 before the first flange 144 is separated from the tube mounting groove 122.

The rotation preventing projection 1464 and the projection mounting groove 132 according to one embodiment of the present disclosure are shaped to have a gradually decreasing circumferential width. Accordingly, when the rotation preventing projection 1464 is separated from the projection mounting groove 132 by pushing the resonance tube 140 toward the first annular wall 120, the resonance tube 140 may be allowed to move in the circumferential direction within a certain range with the rotation preventing projection 1464 slightly separated from the projection mounting groove 132. Then, the resonance tube 140 may be more easily separated from the outer circumferential surface of the wheel rim 110.

Figure 5:
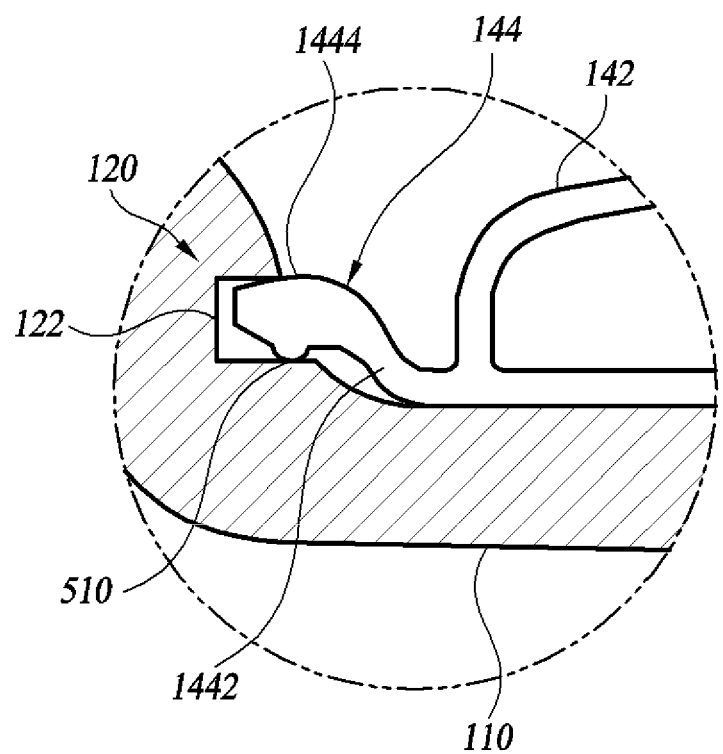
FIG. 5 is an enlarged cross-sectional view of area B of FIG. 2 in the resonator wheel according to one embodiment of the present disclosure.

FIG. 5 is an enlarged cross-sectional view of area B of FIG. 2 in the resonator wheel 10 according to one embodiment of the present disclosure.

Referring to FIG. 5, the first flange 144 may include an elastic region 1442 formed between one end of the first flange 144 and the tube body 142. Here, the elastic region 1442 refers to an area of the first flange 144 having an elastic material.

The elastic region 1442 may be elastically deformed to urge the tube body 142 toward the second annular wall 130 when the resonance tube 140 is mounted on the outer circumferential surface of the wheel rim 110.

Then, compression force applied from the first annular wall 120 and the second annular wall 130 toward the tube body 142 is generated in the resonance tube 140. Thereby, the resonance tube 140 may be axially securely mounted on the outer circumferential surface of the wheel rim 110.

The elastic region 1442 may include an elastic fold. The elastic fold may include at least one fold structure in the elastic region 1442.

Thus, the elastic fold according to one embodiment of the present disclosure may cause a larger elastic deformation to occur within a confined space between one end of the first flange 144 and the tube body 142 through the fold structure formed of an elastic material. Thereby, the resonance tube 140 is more axially securely mounted on the outer circumferential surface of the wheel rim 110.

The first flange 144 may include an insertion region 1444, which is formed at one end of the first flange 144. Here, the insertion region 1444 refers to an area of the first flange 144 that is inserted into the tube mounting groove 122 of the first annular wall 120.

One radially outer surface of the insertion region 1444 may have a downward slope inclined toward the tube mounting groove 122. The downward slope formed on one surface of the insertion region 1444 allows one end of the first flange 144 to be readily inserted into the tube mounting groove 122 even when there is a tolerance in the radial width of the tube mounting groove 122 or the radial thickness of one end of the first flange 144.

An elastic fitting projection 510 may be formed on the opposite surface of the insertion region 1444. When the insertion region 1444 is mounted in the tube mounting groove 122, the elastic fitting projection 510 may be elastically deformed to press the insertion region 1444 radially outward.

Accordingly, one end of the first flange 144 inserted into the tube mounting groove 122 through the downward slope of the insertion region 1444 may be securely fixed to the tube mounting groove 122 by the elastic deformation of the elastic fitting projection 510, irrespective of the degree of tolerance in the radial width of the tube mounting groove 122 or the radial thickness of one end of the first flange 144.

Although exemplary embodiments of the present disclosure have been described for illustrative purposes, those skilled in the art will appreciate that various modifications, additions and substitutions are possible, without departing from the spirit and scope of the appended claims. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereto should be construed as being within the scope of the disclosure.

The invention claimed is:

1. A resonator wheel comprising:
   a wheel rim;
   a first annular wall protruding from an outer circumferential surface of the wheel rim along a circumference of the wheel rim, the first annular wall comprising a tube mounting groove formed on one side surface of the first annular wall;
   a second annular wall protruding from the outer circumferential surface of the wheel rim along the circumference of the wheel rim and spaced apart from the first annular wall;
   a plurality of resonance tubes disposed on the outer circumferential surface of the wheel rim between the first annular wall and the second annular wall, each of the resonance tubes comprising:

a tube body comprising a resonance chamber and a communication hole extending from the resonance chamber;

a first flange protruding from one side of the tube body and having one end inserted into the tube mounting groove; and a second flange protruding from an opposite side of the tube body and having one end disposed adjacent to the second annular wall; and a fastening member surrounding one radially outer surface of the second flange between the tube body and the second annular wall along the circumference of the wheel rim, the fastening member pressing the second flange in a radially inward direction of the wheel rim, wherein the second flange comprises a fastening member seating step protruding from one end of the second flange in a radially outward direction of the wheel rim, and each of the resonance tubes comprises a fastening groove defined in a space between one side wall of the tube body facing the second flange and the fastening member seating step, the fastening member being mounted in the fastening groove.

2. The resonator wheel of claim 1, wherein the second flange comprises a rotation preventing projection protruding from one end of the second flange and the second annular wall comprises a projection mounting groove formed on one side surface of the second annular wall, wherein the rotation preventing projection is inserted into the projection mounting groove to prevent the resonance tubes from moving on the outer circumferential surface of the wheel rim in a circumferential direction.

3. The resonator wheel of claim 1, wherein the first flange comprises an elastic region formed between one end of the first flange and the tube body, wherein, when the resonance tubes are mounted on the outer circumferential surface of the wheel rim, the elastic region is elastically deformed to urge the tube body toward the second annular wall.

4. The resonator wheel of claim 3, wherein the first flange further comprises an insertion region formed at the one end of the first flange, wherein one radially outer surface of the insertion region has a downward slope inclined toward the tube mounting groove, and an opposite surface of the insertion region is provided with an elastic fitting projection, and wherein, when the insertion region is mounted in the tube mounting groove, the elastic fitting projection is elastically deformed to press the insertion region radially outward.

5. The resonator wheel of claim 1, wherein the plurality of resonance tubes have different resonance frequencies.

* * * * *